May 15, 1962 — O. H. MUCK — 3,034,309
METHOD FOR TRANSPORTING GAS
Filed Jan. 18, 1956
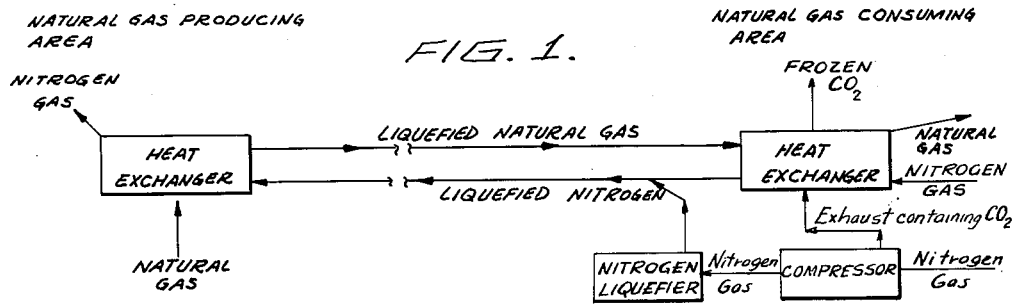
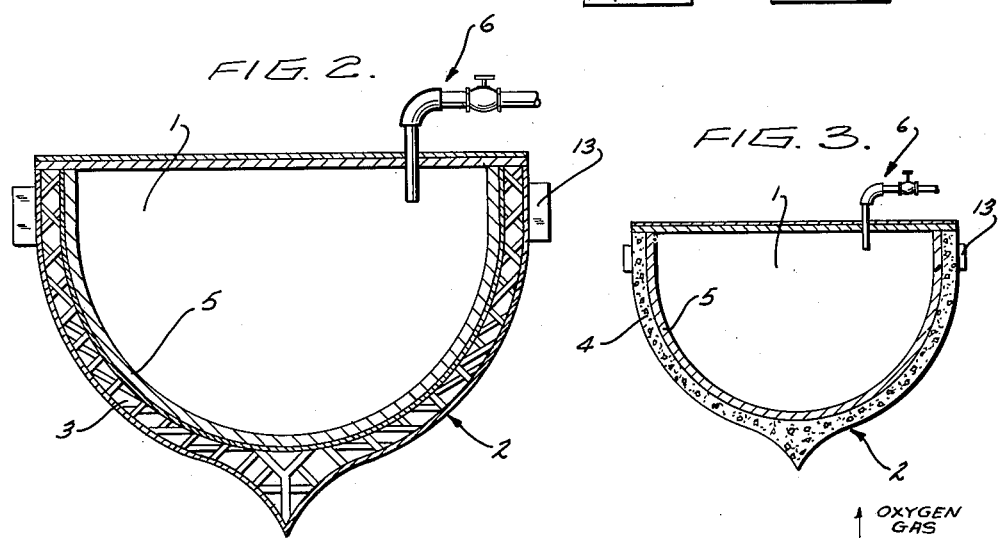
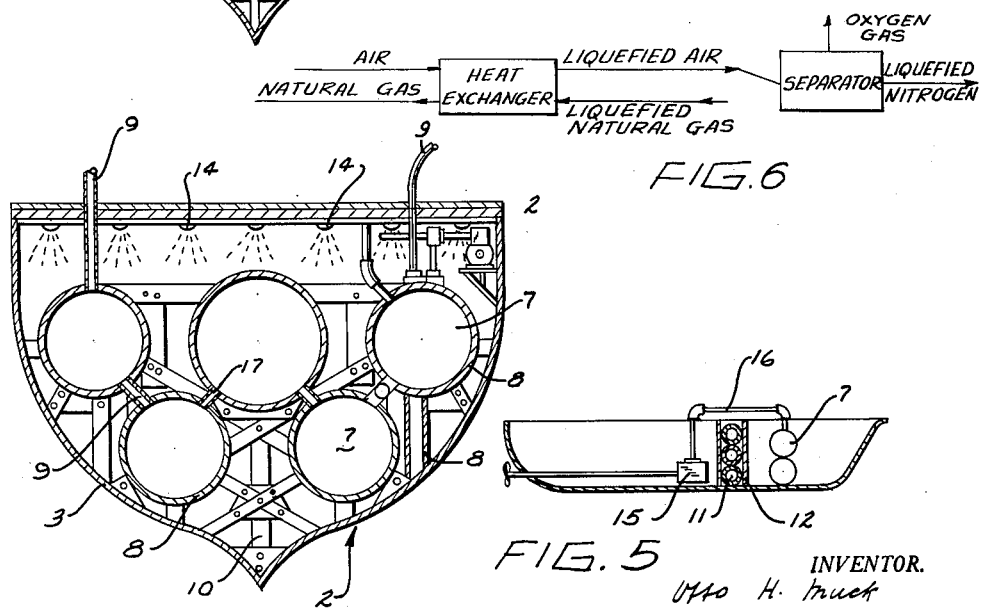
INVENTOR.
Otto H. Muck
BY Michael S. Striker
agt.

United States Patent Office 3,034,309
Patented May 15, 1962

3,034,309
METHOD FOR TRANSPORTING GAS
Otto H. Muck, Uffing (Staffelsee),
Upper Bavaria, Germany
Filed Jan. 18, 1956, Ser. No. 560,018
Claims priority, application Germany Jan. 19, 1955
2 Claims. (Cl. 62—55)

The present invention relates to a method and apparatus for transporting gas, and more particularly it relates to a method and apparatus for transporting gas from natural gas-producing areas to distant natural gas-consuming areas.

Natural gas-producing areas are frequently located far distant from industrialized natural gas-consuming areas. In such cases the transportation of natural gas to the consuming areas is an expensive and complicated undertaking, especially when it is not possible or not desired to construct a pipe line through which natural gas could be pumped from the natural gas-producing field to the consuming area. In the absence of pipe lines, large quantities of natural gas can only be transported in liquefied condition. It is desirable to use for the transportation of liquefied natural gas the largest possible containers. For this reason preference is given to transportation by water in large tankers adapted for the transportation of liquefied natural gas. Consequently it has been proposed to install at the natural gas-producing field liquefying installations in which the natural gas as it flows from the bore holes can be liquefied. The liquefied natural gas may then be directly pumped into suitable tankers or may first be stored in stationary storage containers. Upon arrival of the liquefied natural gas at the gas-consuming area, the liquefied gas is again volatilized. It has been suggested to use the cooling energy which is released upon volatilization of the liquefied natural gas for local cooling purposes such as the operation of cold storage facilities and the like.

However, considerable disadvantages are connected with transporting natural gas in the aforedescribed manner. The cooling energy required for liquefication of one cubic meter of natural gas, assuming that the natural gas flows under an overpressure of about 100 atmospheres, amount to approximately 0.7 horsepower per hour. In order to utilizes relatively large sources of natural gas, supplying for instance 200,000 cubic meters per hour, it would then be necessary to install in the remote natural gas-producing area very large liquefying plants including a compressor installation of about 140,000 horsepower. In addition thereto it would also be necessary to provide auxiliary facilities including living quarters and facilities for the personnel required for operation of the liquefying plant and also for their families. The power required for operating the compressor installation and tanker engines, and losses incurred due to the practical limitations in heat insulation will require between 25 and 30% of the entire quantity of natural gas entering the compressor installation. It has also to be considered that in such an arrangement there would be an ever present danger of the formation of explosive natural gas-air mixtures, either in the compressor installation, or the tankers which return with empty tanks from the natural gas-consuming area to the producing field.

It is therefore an object of the present invention to overcome the aforementioned difficulties and disadvantages in the transportation of natural gas.

It is another object of the present invention to provide a method and apparatus for transporting gas with a minimum expenditure of cooling energy.

It is a further object of the present invention to provide a method and apparatus for transporting gas which can be safely executed without risking the formation of explosive gas-air mixtures.

It is another object of the present invention to provide a method and apparatus for transporting gas in an efficient and economical way.

Other objects and advantages of the present invention will become apparent from a further reading of the description and the appended claims.

With the above objects in view the present invention consists in a method of transporting natural gas from a natural gas-producing area to a natural gas-consuming area comprising the steps of transporting a liquefied inert gas from a natural gas-consuming area to a natural gas-producing area, bringing the liquefied inert gas in the natural gas-producing area into heat exchange with natural gas so as to liquefy the natural gas and to volatilize at least a portion of the liquefied inert gas, transporting the liquefied natural gas to the natural gas-consuming area, bringing the liquefied natural gas in the natural gas-consuming area into heat exchange with a gas consisting at least partially of the inert gas so as to volatilize the liquefied natural gas and to liquefy the inert gas, thereby transporting the natural gas from the natural gas-producing area to the natural gas-consuming area and also forming a portion of the liquefied inert gas to be transported to the natural gas-producing area.

The present invention also includes in a ship a storage device for storing liquefied gas comprising, in combination, hollow floatable container means including a shock and bend resistant, heat insulating shell, and means communicating with the interior of the shell for introduction and removal of liquefied gas.

According to the present invention the cooling energy released by volatilizing the liquefied natural gas is used to liquefy an inert carrier for the cooling energy such as nitrogen gas, and to transport the liquefied nitrogen gas to the natural gas-producing area where the cooling energy is transferred from the inert carrier to natural gas which thereby is liquefied. It is thus only necessary to liquefy in addition to the quantity of inert gas which is liquefied by utilization of the cooling energy released from natural gas upon its volatilization, an additional amount of inert gas sufficient to replace the losses of cooling energy which take place throughout the entire system. Thus, only a relatively small compressor installation is required for only supplying this additional amount of cooling energy in the form of liquefied nitrogen or in the form of another liquefied inert gas. While it is preferred to locate the compressor installation for liquefying this additional amount of nitrogen in the natural gas-consuming area, in connection with the installation in which the liquefied natural gas is volatilized, it is of course also possible to locate the relatively small compressor installation at any other suitable location, for instance also at the gas-producing area. While consequently the present invention in its broadest aspects is not limited to any specific location of the compressor or other nitrogen liquefying installation for supplying the required additional amount of liquefied nitrogen at any specific point, it has been found that great economy in the operation of the entire installation and the execution of the method of the present invention is achieved by preferably locating the liquefying installation for the additional quantity of nitrogen in the natural gas-consuming area.

The term "cooling energy" is used herein to denote the equivalent of the amount of energy which would have to be expended in a compressor installation in order to liquefy the respective gas.

According to the present invention an inert gas, preferably nitrogen, is used as carrier for the cooling energy required for liquefying the natural gas. By utilizing for this purpose an inert gas which cannot react with either the natural gas or with the oxygen of the air, the formation of explosive gaseous mixtures which might become the cause of dangerous conflagrations is prevented. Consequently it is also possible to transport the liquefied nitrogen to the gas-producing area in the same containers which are used for transporting the liquefied natural gas from the gas-producing area to the gas-consuming area. This could not be achieved would for instance air be used as the gas which is to be liquefied in order to serve as carrier of the cooling energy. If liquefied air would be transported in the same containers which previously contained liquefied natural gas, there would always exist the danger of the formation of explosive gaseous mixtures of the oxygen of the liquefied air and the natural gas. Therefore, when liquefied air is to be used as carrier for the cooling energy it cannot be avoided to install separate containers for carrying the natural gas in liquefied form and for carrying the liquefied air. This obviously would nearly double the tonnage of the tankers required for execution of the method of the present invention, if the same includes transportation over water. Thereby the transportation costs would be vastly increased and similar disadvantageous conditions would exist by transporting liquefied natural gas in one direction and liquefied air in the opposite direction over land in railroad tank cars, tank trucks or other devices. It is only by using, in accordance with the present invention, a liquefied inert gas, preferably nitrogen, as carrier for the cooling energy that the danger of explosions is prevented.

According to the present invention the method of economically transporting natural gas from distant producing areas to gas-consuming areas includes transportation of the natural gas in liquefied form to the gas-consuming areas and transferral of the cooling energy of the liquefied natural gas to an inert gas, preferably nitrogen, which is thereby liquefied. The liquefied nitrogen is then filled into the empty tanks which were previously used for transportation of liquefied natural gas to the gas-consuming area. Obviously these tanks may be either containers for overland transportation or storage devices in tankers. The liquefied nitrogen is then transported to the gas-producing area and is there utilized for liquefying natural gas. The nitrogen gas required for the execution of the method of the present invention is preferably obtained from air in conventional manner. Thereby oxygen is also obtained and made available for commercial use. The thus-obtained nitrogen gas is preferably first compressed to about between 15 and 20 atmospheres and is then liquefied in counter-current to the liquefied natural gas which thereby is volatilized. The thus-obtained liquid nitrogen can be filled without danger into the same tank in which the liquefied natural gas has previously been transported.

A portion of the liquefied nitrogen may also be used as a precautionary means for fire prevention during transportation of the liquefied natural gas. This may be done in such a way that from a suitable storage container liquefied nitrogen is sprayed at any points from which due to leakage natural gas escapes. Thereby the formation of explosive air-natural gas mixtures can be prevented.

Oxygen which is produced as a by-product, preferably at the location where the liquefied natural gas is again volatilized, can be made available at very low cost for various uses. Since oxygen according to the present invention is produced as a by-product during the production of inert nitrogen, it becomes more cheaply available than by producing it as the main product of an oxygen-producing installation.

According to a preferred embodiment of the present invention, the pressure of a portion of the natural gas is reduced from about 100 atmospheres to normal pressure whereby mechanical energy is expended and the temperature of the natural gas in considerably reduced. The thus-cooled natural gas is then passed through a heat-exchanger countercurrently to previously liquefied inert gas, thereby liquefaction of the precooled portion of natural gas is achieved in a very short period of time and without requiring a complicated apparatus and expensive maintenance thereof. The reduction of maintenance requirements in the natural gas-producing area is of considerable economic importance since it reduces the number of people for whom living facilities have to be provided in the usually remote natural gas-producing area.

The method of the present invention permits also to produce solid frozen carbon dioxide from the waste gases of the compressor installation preferably located in the gas-consuming area. The compressor installation is required for producing the quantities of liquefied nitrogen which are needed in addition to the amount of nitrogen which can be liquefied by volatilizing the liquefied natural gas. Cooling energy which is liberated during the volatilization of the liquid natural gas can be most economically used for the production of solid frozen carbon dioxide which usually finds a ready market.

Special apparatus is required for the transportation and storage of the liquefied natural gas and of the liquefied nitrogen or other inert gas which is used for transfer of the cooling energy, or in other words for extracting a sufficient amount of heat from the natural gas so as to liquefy the same.

Regular structural steel does not withstand the extremely low temperatures to which it would be exposed according to the method of the present invention, and it is therefore necessary to cover steel elements with a suitable, heat and cold insulating layer. This insulating layer separates then the liquefied natural gas or the liquefied nitrogen from the container walls and other structural parts of the storage and transportation device. The liquefied gases may be transported either by land or by sea. Since very large quantities are to be transported it is preferred, wherever possible, to use ships for the transportation of the liquefied natural gas and the liquefied nitrogen. The present invention, however, is not limited to any specific transportation means such as ships, railroad tank cars, tank trucks or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic view of an arrangement according to the present invention;

FIG. 2 is a schematic transversal cross-sectional view of a ship adapted to transportation and storage of liquefied natural gas and liquefied nitrogen according to the present invention;

FIG. 3 is a schematic transversal cross-sectional view of another embodiment of a ship adapted to transportation and storage of liquefied natural gas and liquefied nitrogen according to the present invention;

FIG. 4 is a schematic transversal cross-sectional view of still another embodiment of a ship adapted to transportation and storage of liquefied natural gas and liquefied nitrogen according to the present invention;

FIG. 5 is a schematic longitudinal cross-sectional view of a ship adapted to storage and transportation of liquefied natural gas and liquefied nitrogen according to the present invention; and FIG. 6 is a diagrammatic sketch of a flow of materials in the consumer area.

Referring now to the drawings and particularly to FIG. 1, it may be seen how in a natural gas-producing area natural gas is passed to a heat exchanger in countercurrent flow with liquefied nitrogen. Thereby the natural gas is liquefied and nitrogen is volatilized and released into the surrounding atmosphere. The liquefied natural gas is transported to the natural gas-consuming area and is there brought in heat exhange with compressed gaseous nitrogen. Thereby the nitrogen is liquefied and the natural gas is volatilized. An additional quantity of nitrogen is liquefied by conventional methods, and the combined quantities of liquefied nitrogen obtained by conventional methods and by heat exchange with the liquefied natural gas received from the natural gas-producing area, are then transported to the natural gas-producing area where the liquefied nitrogen is brought in heat exchange with natural gas as described above. As by-products of the production of nitrogen, oxygen is separated, and if desired liquefied in an installation located in the natural gas-consuming area. Furthermore it is possible to use a portion of the heat loss or cooling energy obtained by volatilization of the liquefied natural gas, to form frozen carbon dioxide from the exhaust gases of the compressor installation required for production of the additional quantity of liquefied nitrogen.

Referring now to FIGS. 2, 3, 4 and 5, the storage device for storing liquefied gas includes hollow floatable container means 1 which may comprise the main body portion of ship 2. Ship 2 is provided with a shock and bend resisting shell 3 made of steel, and preferably of two parallel steel walls spaced from each other by spacer means well known in the shipbuilding art. The shock and bend resisting shell may also be formed of concrete as indicated by reference numeral 4. The inner surface of the shock and bend resisting shell 3 or 4 is covered with an insulating layer 5. Insulating layer 5 may consist of cellular concrete or of metallized foam plastics. Pipe and valve arrangement 6 constitutes means communicating with the interior of the shell for the introduction and removal of liquefied gas. While it is possible to store the liquefied gas in the main body portion of the ship which is surrounded by the shock and bend resistant, heat insulating shell, it is frequently preferred, and also within the scope of the present invention, to provide within the ship's shell a plurality of metal containers 7 which may also be covered by a heat insulating layer 8. Heat insulating layer 8 may also be of cellular concrete or metallized foam plastics. While it is generally preferred to have heat insulating layer 5 covering the interior surface of shell 3 or 4, made of cellular concrete, and heat insulating layer 8 covering metal containers 7 made of metallized foam plastics, the present invention is in no ways limited to any specific heat insulating material. According to a preferred embodiment of the present invention, metal containers 7 are made of aluminum. Aluminum possesses the required mechanical strength, will not be chemically affected by the liquefied natural gases or the liquefied nitrogen, and compared with steel containers affords considerable savings in weight. A system of pipes and valves 9 communicates with the interior of containers 7 for introduction and removal of liquefied gases therefrom. It is also within the scope of the present invention to so arrange the means 9 communicating with the interior of the individual metal containers 7 that in case of leakage occurring in any one of containers 7 the contents of the same may be easily transferred to any other one of the plurality of containers 7. It is equally possible to so adjust means 9 as to permit storage in one of the plurality of containers 7 of liquid nitrogen while all of the other, or a plurality of the other, containers 7 are filled with liquid natural gas. The liquid nitrogen stored in one of containers 7 may then be used for fire fighting purposes wherever required. Similarly it is possible while transporting liquefied nitrogen to fill one or several of containers 7 with liquefied gas to be used for propelling the ship's engines 15. Metal containers 7 are rigidly connected with hull 3 of ship 2. This connection is preferably achieved by means of high chromium content steel beams 10 which have a considerable resistance against the influence of extreme cold emanating from the liquefied gases in the storage containers. Nevertheless, care has to be taken to limit the influence of the cold to such an extent that it will not detrimentally influence the structural elements in the hull. This is accomplished by the arrangement of insulating layers 5 or 8, as well as by heating pipes 11 arranged in bulkhead 12 or other structural elements. The heating fluid such as hot air passing through pipes 11 will prevent exposure of cold-sensistive structural parts to excessive cold. In view of the high inflammability of the natural gas and the danger of formation of highly explosive gas-air mixtures in case of leakage of natural gas, it is desirable, according to a preferred embodiment of the present invention to arrange shock absorbing means 13 on the outside of hull 2 or 4 in the proximity of the water line. Shock absorbing means 13 will then prevent damage and possible leakage in case of minor collisions or rough berthing of ship 2. Preferably fire extinguishing means 14 are connected with a metal container 7 containing liquid nitrogen and are provided with nozzle outlets or other suitable outlets in various locations about the ship so as to make inert liquid nitrogen gas available for fire fighting purposes wherever and whenever required. Ship propelling engine 15 is connected by a pipe and valve arrangement 16 with at least one of storage containers 7 for the passage of natural gas from said one storage container 7 to the ship propelling engine 15. It is also within the scope of the present invention to fill the space surrounding storage containers and pipe lines for liquefied natural gas with nitrogen at a pressure higher than the pressure of the liquefied natural gas, so that in case of leakage nitrogen will enter the storage containers and pipe lines containing liquefied natural gas while not permitting the escape of liquefied natural gas therefrom. The means for introducing and maintaining cold nitrogen gas at a pressure higher than the pressure of the liquefied natural gas in the containers and pipe lines may include jacket means which surround the conduit means or pipes 17 through which natural gas passes to and from individual containers 7.

The storage and transportation devices according to the present invention and irrespective of whether adapted to transportation by land or sea can be divided into two groups:

(1) Transportation devices, especially tankers provided with a weight carrying insulating lining. In this case the insulating layer or lining is preferably made of cellular concrete, foam- or gas concrete. Because of its limited heat insulating property it is preferred to form as far as possible the main body portion, or the main portion of the available cavity as a unitary, insulated large single container which is subdivided as far as necessary by baffle arrangements made of concrete or aluminum. Tankers of this kind must be provided with an outer shell which is absolutely resistant against twisting, bending and denting. Consequently the ship may be constructed in well known ways as a concrete ship without bulkheads and partitions. The ship may also be built as a multiple shell steel hull with reinforcements between the individual steel shell layers. By using in place of the heavy cellular concrete with its limited heat insulating property, plastic cellular material which has been outwardly metallized, it is possible because of the reduced weight and thickness of the insulating layer to use regular container and tanker designs such as are described below.

(2) Transportation devices, especially tankers provided with non-weight carrying insulating layer, formed for instance of foam plastic materials which are metallized or covered with asbestos or a thin layer of cellular concrete. In this case regular ship bodies can be used, having bulkheads formed by or with pipe elements. Within the spaces defined by the transversal bulkheads containers for liquefied gas, preferably made of aluminum are arranged. The individual metal containers are secured by profiled structural members made of high chromium steel, for instance of the type V2A, against the ship's bottom and deck. These structural members absorb the weight and inertia forces created by the individual metal containers so that the insulating layer which adheres to the inner surface of the ship's shell does not have to carry any weight. The transversal bulkheads are also insulated and the pipe elements forming an essential portion thereof are preferably heated by passing therethrough dry warm air from the engine room. Thereby the bulkheads are protected against excessive cooling.

Since handling and transportation of highly inflammable liquids entails considerable danger, it is preferred in accordance with the present invention to surround the transportation device at least partially with shock absorbing means, in case of tankers preferably about the height of the waterline, in order to prevent the risk involved in collisions with other boats or harbor installations.

It will be understood that each of the elements described above, or two or more together, may also find a useful application in other types of storage and transportation devices for liquefied gas differing from the types described above.

While the invention has been illustrated and described as embodied in ships for transportation of liquefied natural gas and liquefied nitrogen, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of transferring natural gas from its source to a point of destination by a ship which includes liquefying said gas at approximately atmospheric pressure, transferring said liquid gas to transport tanks aboard ship, transferring said liquid gas to storage tanks at the point of destination, transferring the heat of an inert gas to said liquid gas to vaporize it and to liquefy said inert gas and replacing the liquid gas in the ships' tanks with the liquid inert gas to maintain the temperature of said tanks and to provide ballast for said ship.

2. A method of transferring natural gas from its source by ship which includes liquefying said gas at approximately atmospheric pressure into tanks, transferring said liquid gas to transport tanks aboard ship, transferring said liquid gas to storage tanks at the point of destination, transferring the heat of gaseous nitrogen to vaporize said liquid gas and to liquefy said nitrogen and replacing said liquid gas in ships' tanks with liquid nitrogen to maintain the temperature of said tanks and to provide ballast for said ship.

References Cited in the file of this patent

UNITED STATES PATENTS

| | | |
|---|---|---|
| 1,680,873 | Lucas-Girardville | Aug. 14, 1928 |
| 1,914,337 | Belt | June 13, 1933 |
| 2,127,536 | Schlumbohm | Aug. 23, 1938 |
| 2,328,647 | Jackson | Sept. 7, 1943 |
| 2,453,946 | Silfrian | Nov. 16, 1948 |
| 2,484,875 | Cooper | Oct. 18, 1949 |
| 2,550,886 | Thompson | May 1, 1951 |
| 2,551,435 | Grogan | May 1, 1951 |
| 2,666,304 | Ahrel | Jan. 19, 1954 |
| 2,675,682 | Dobson | Apr. 20, 1954 |
| 2,685,181 | Schlitt | Aug. 3, 1954 |
| 2,729,074 | Monroe et al. | Jan. 3, 1956 |
| 2,783,264 | Morrison | Mar. 5, 1957 |
| 2,799,997 | Morrison | July 23, 1957 |
| 2,909,906 | Bosquet et al. | Oct. 27, 1959 |

FOREIGN PATENTS

| | | |
|---|---|---|
| 736,736 | France | Sept. 26, 1932 |